June 16, 1959 W. J. BURGON ET AL 2,891,046
METHODS OF PROCESSING AND REFINING CRUDE
CHEMICAL FRACTIONS OBTAINED FROM BARK
Filed Oct. 29, 1956

INVENTOR.
WILLIAM J. BURGON
PIOTR ZENCZAK
BY
ATTORNEYS

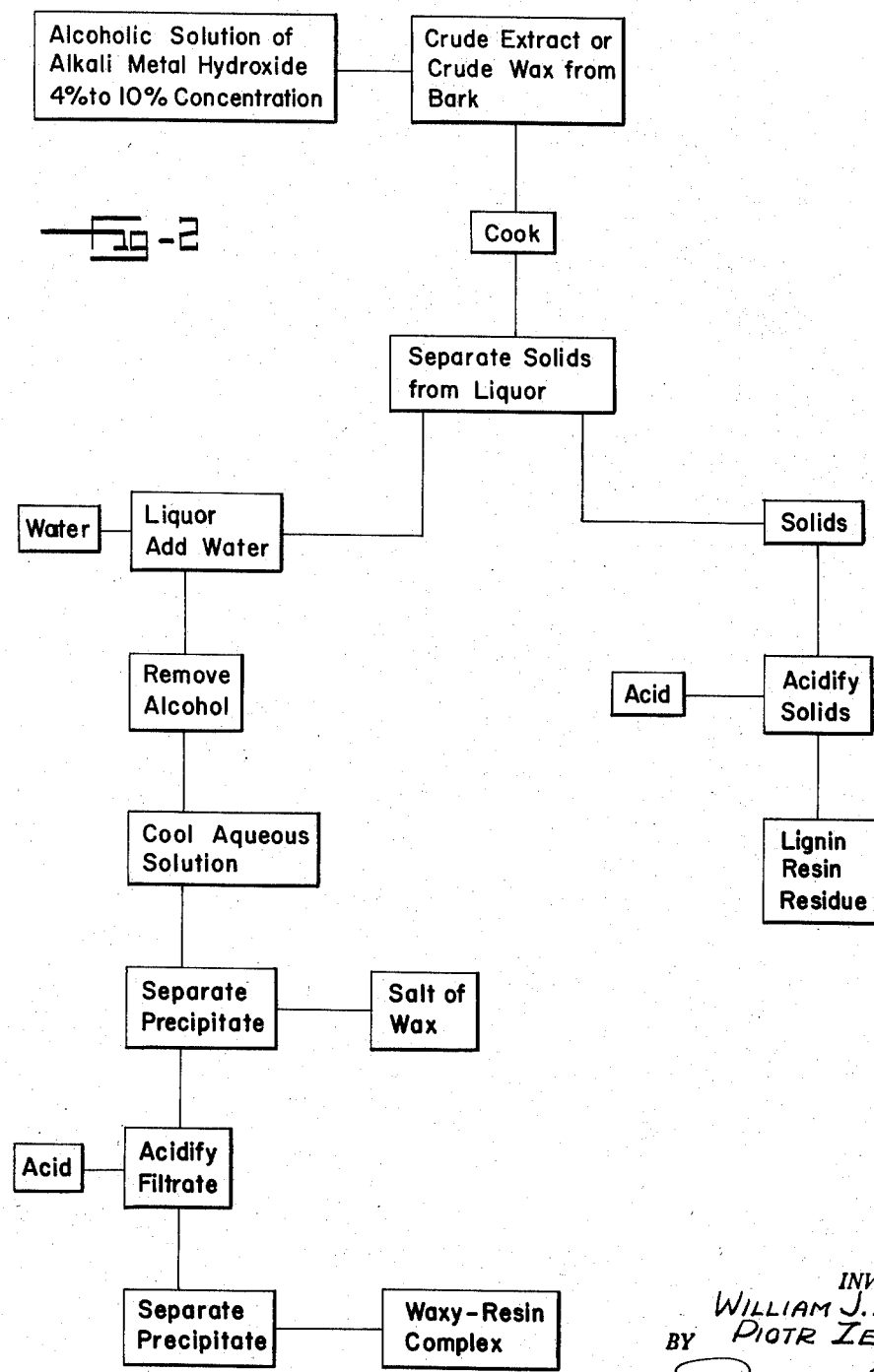

2,891,046
METHODS OF PROCESSING AND REFINING CRUDE CHEMICAL FRACTIONS OBTAINED FROM BARK

William James Burgon, New Westminister, British Columbia, Canada, and Piotr Zenczak, Coos Bay, Oreg.

Application October 29, 1956, Serial No. 618,848

7 Claims. (Cl. 260—124)

This invention relates to new and improved methods of processing and refining chemical fractions of bark. More particularly, the invention relates to new and improved methods of treating, processing and refining crude chemical fractions which have been previously produced, separated and recovered from raw bark.

By various techniques or processes, crude chemical fractions have been previously separated and recovered from bark. Examples of such processes are taught in the Kurth Patent No. 2,662,893, dated December 15, 1953. There are also numerous other known methods by which chemical fractions may be recovered from bark.

The composition of these crude chemical fractions will vary according to the means employed to remove them from the bark. In most instances, however, the extracted crude substance is in the form of a resinous complex which will contain varying proportions of wax acids, esters, alcohols and sterols. The major portion of the resinous material is made up of a lignin substance and tannins and dihydroquercetin which may be present as major constituents of the crude complex or only as contamination substance. Experiments have been performed over a wide range of crude chemical fraction compositions obtained from bark to determine or discover the most desirable and practical methods of recovering the resinous materials from the crude and to separate the resin complex into more specific parts.

It is the principal object of this invention to provide a new and improved method whereby the resinous material may be removed from the crude extract composition obtained from the initial treatment of raw bark.

Further, it is an object of this invention to provide a new and improved method for removing this resinous material from the crude by relatively expedient and inexpensive procedures so that the remaining portion of the crude may be more readily processed and separated into its various chemical fractions.

Other objects of this invention will hereinafter be more fully described as will be apparent from the following description.

The essence of this new and improved method of treating or processing the crude resides in cooking the crude in an alcohol-alkali solution under the following conditions. The crude is cooked in an alcohol-alkali solution wherein the strength of the alkali is within the range of 4% to 10% of the alcohol depending upon the temperature and pressure of the cooking cycle. The alcohol solution employed should be about ten times the weight of the crude starting material. The amount of water present should not exceed 10% of the combined weight of the crude and the alcohol-alkali solution. If the cooking cycle is carried out under the reflux temperature of the alcohol, then the alkali present should be no more than 10% of the weight of the alcohol. If the cooking cycle is carried out under the temperatures and pressure exceeding 5 pounds alcohol pressure, the amount of alkali present should be no more than 4% of the weight of the alcohol. While the ratio of the alcohol-alkali solution to the weight of the crude may be varied, it has been found that a 10 to 1 ratio produces the most desirable results. Likewise, the ratio of water to the total weight of crude and alcohol solution may vary, but the most satisfactory results are obtained when the water present does not exceed 10% of the total combined weight of the crude and alcohol solution.

The majority of experiments have been made with crude extracts from Douglas fir bark. However, experiments have also been made with crude extracts from lodge pole pine and yellow pine. Also, in the experiments, sodium hydroxide has generally been used but it will be appreciated that other alkali metal hydroxides, such as potassium hydroxide, may be used in place of sodium hydroxide.

When the conditions above recited are maintained during the cooking cycle, a part of the resin complex becomes insoluble in the solution. It coagulates and may be removed by decanting or centrifuging the coagulated material from the alcohol solution. The other components of the crude will remain soluble. The insolubility of the resinous material contained in the crude occurs progressively as the alkaline strength of the alcoholic solution is increased and as the temperature and pressure of the cooking cycle is increased. As has been previously stated, this resinous material is made up mostly of a lignin substance and tannins and dihydroquercetin. As a result of several experiments, it has been discovered that the lignin substance is substantially insoluble in an alcohol-alkali solution. It is soluble in an aqueous-alkali solution and a part of the lignin substance is soluble in alcohol. When treated under the prescribed conditions in an alcohol-alkali solution, the lignin substance forms a salt which is insoluble in the solution and a resin which is soluble in the alcohol solution. The insoluble salt can therefore be removed from the solution. Since this lignin substance is soluble in aqueous-alkaline solvents, it will be present in the crudes obtained by using these solvents. It may also be present in minor amounts as a contaminating substance in crudes obtained by other methods.

It has been discovered that relatively pure dihydroquercetin, which is soluble in alcohol, develops insolubility when it is treated in an alcohol-alkali solution, under the preferred conditions recited above. The dihydroquercetin obtained from bark and its insolubility under the prescribed conditions was determined when a quantity of the dihydroquercetin was introduced into an alcohol-alkali solution. In another experiment, the prescribed amount of alkali was introduced into a previously prepared alcohol solution of dihydroquercetin.

The dihydroquercetin is soluble in a number of solutions, including hot water and alcohol and will, therefore, be present as a major constituent in the crude extracted or removed from raw bark by these solvents. It will also be present in minor amounts in crudes which have been obtained by methods employing an alkaline catalyst and alcohol or solvents in which the dihydroquercetin is not soluble. Also, it will be present in minor amounts in a crude obtained from bark even though the bark had previously been extracted with hot water or alcohol. In such cases, it is present in minor amounts due to the imperfection of the extraction and separation process by which the primary crude is obtained.

In addition to the lignin substance and dihydroquercetin present in the crude, tannin is also present as an element of the resinous material. The tannin is similar to dihydroquercetin in that it is soluble in alcohol and water and substantially insoluble in an alcohol-alkali solution. The tannin removal from the crude takes place simultaneously with the dihydroquercetin as part of the resinous material when the crude is cooked in accordance with the conditions prescribed. Because this resin composition which is made up of lignin substance, tannin and dihydroquercetin interferes with the further processing of the crude, it should be removed from the crude as soon as possible. It is fortunate that these materials develop insolubility under the conditions described so that they may be removed progressively as insoluble resin salt from the alcohol-alkali solution of the crude material being treated and refined.

There are several important advantages in initially processing the crude to remove these resin materials before proceeding with the further refining and separation of the other elements or fractions contained in the crude. After removal of these resin materials, the remaining crude may be further refined and processed as a clarified crude and, as such, it facilitates the separation and recovery of further resin acids, waxes, fatty acids and alcohols. This is particularly desirable when any of these materials are to be recovered as salts.

It has also been discovered that additional quantities of the resin fraction can be separated and recovered as alcohol insoluble salts by treating the crude in a progressively concentrated alcohol-alkali solution and by removing the insoluble residue at intervals as the concentration of alkali is increased. It has been determined that the alkali concentration should not exceed 10% of the alcohol solution when the cooking and concentration is carried out under the reflux temperature of the alcohol. When the cooking and concentration treatment is carried out under elevated temperatures or pressures, the concentration of the alcohol-alkali solution should not exceed 4%. Beyond these limits there is a tendency for the development of a further contaminating material which interferes with the later recovery of the waxes and acids.

Experiments have shown that there is also an additional fraction of the resin complex which will remain soluble in the alcohol-alkali solution so that this fraction is not separated out under the limited conditions of processing herein described. This resin fraction remains soluble through the aqueous alkaline phases of further processing and is finally recovered from the acidified filtrate liquor after the wax acids and alcohols have been recovered as salts. This resin can now be recovered as a more specific fraction if the alcohol insoluble salt fraction has been previously removed.

There is still a further part of the total resin complex fraction which does not precipitate when the filtrate liquor from recovery of the wax acids and alcohols is acidified to a pH of 2. This resin fraction remains dispersed and can only be recovered by concentrating the filtrate liquor. This dispersing resin fraction is greatly reduced if the alcohol insoluble salt fraction has been previously removed.

As previously stated, numerous crude extracts or crude chemical fractions of bark have been treated according to the processes of this invention to remove and separate the resinous material and to produce a clarified liquor for the further separation of waxes, fatty acids and fatty alcohols. The various crude chemical fractions employed to demonstrate the method and results include substances in the form of acids and substances in the form of salts. Such crudes may be a total crude salt or an acidified total cake and both forms were included in the experiments.

The various crude substances obtained from the bark which have been the subject matter of the experiments can be divided into four categories. One group of crude substances was obtained by treatment of bark in an alcohol-alkali solution. The second group of crude substances was obtained by treating bark wherein no alkali was present in the initial treating solution. A third group of crude substances was obtained by treating the bark in an aqueous-alkali soltuion. A fourth crude substance which was the subject of experimentation was a crude resin wax complex obtained from Douglas fir bark by means not specified.

The first two groups may be further divided and defined as follows:

The crudes obtained from an alcohol-alkali treatment of bark:

a. A crude obtained by the treatment of bark in a solution of an alkali metal hydroxide and alcohol wherein the crude was recovered as a salt.

b. A crude obtained by the treatment of bark in an alcohol solution of an alkali metal hydroxide wherein the crude was recovered as an acidified cake.

The crudes obtained wherein no alkali was employed:

a. A crude obtained by treating the bark with water and steam extraction of the bark.

b. A crude obtained by alcohol extraction of the bark.

c. A crude obtained by the extraction of bark in alcohol and acid.

d. A crude obtained by extracting the bark with benzene.

After the various crude chemical fractions of bark have been produced by the several methods previously referred to, it is often necessary to treat the crude so as to remove free mineral acids if these have been used and to remove excessive water from the crude material. If the crude has been produced in an alcohol solution, the desired alkali strength of the liquor can be obtained by merely adding sodium hydroxide or other alkali metal hydroxide to the alcohol extract liquor. If the bark was treated in an alcohol solution of alkali metal hydroxide, the process alcohol-alkali solution may be adjusted by evaporating part of the alcohol to concentrate the solution to the desired alkali strength.

In the drawings which form a part of this application, the methods for processing and refining of the crude chemical fractions of the bark so as to remove the resin complex therefrom have been diagrammatically illustrated.

In the drawings:

Fig. 2 illustrates the method of refinement of other crudes.

Figure 1:
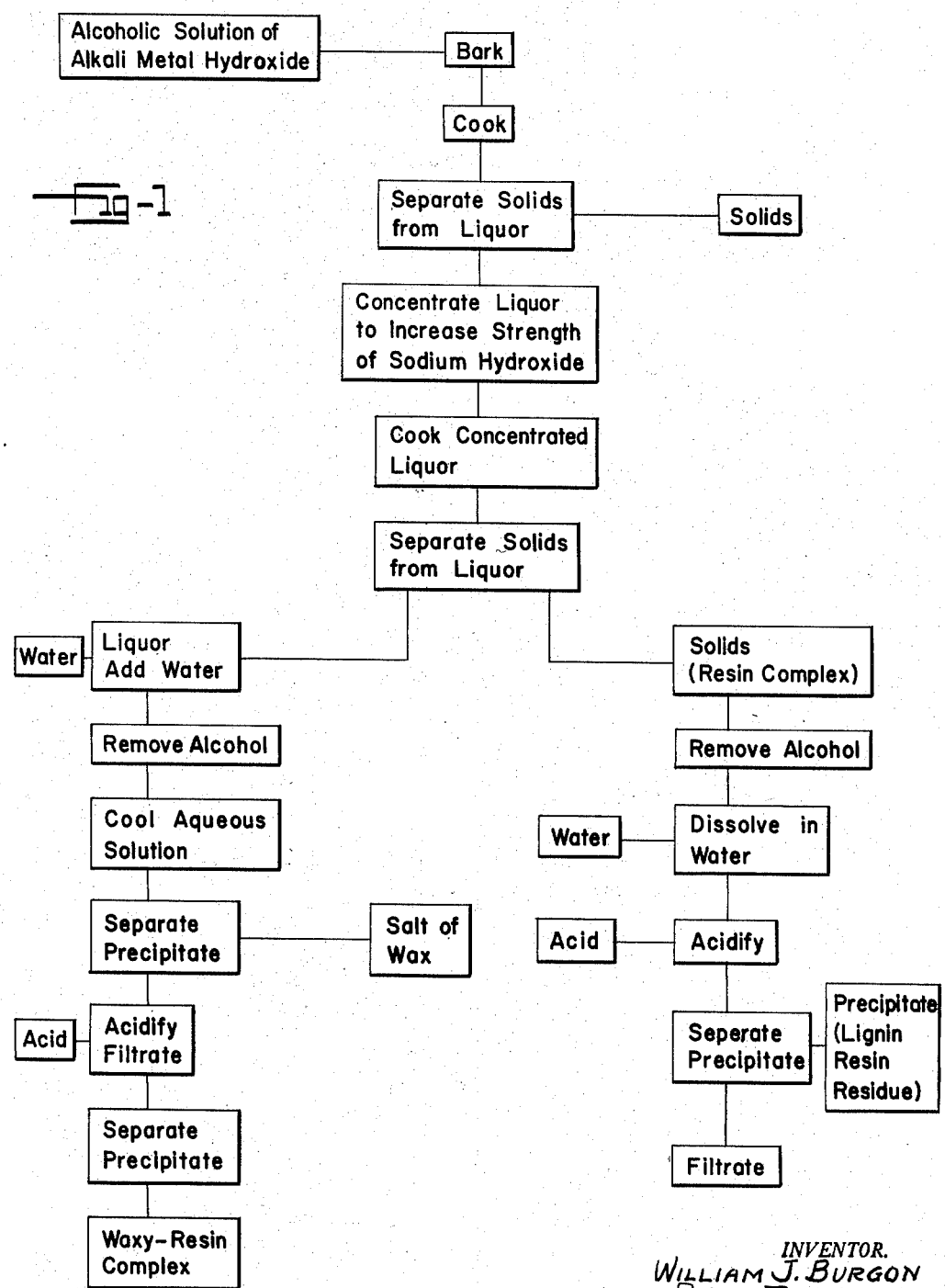
Fig. 1 illustrates the method of refinement of a bark crude produced by treatment of bark in a low concentration of alkali.

The following are specific experiments which illustrate in greater detail the manner in which the several crude extracts recovered from bark have been processed and refined by the herein disclosed new and improved methods or techniques.

EXAMPLE I

*Refinement of alcohol-alkali dry crude*

(a) Preparation of alcohol-alkali extract from Douglas fir bark.

Douglas fir bark was ground and extracted with hot water and then dried to 7% moisture content. 100 grams of the dried bark was cooked under reflux for two hours in a solution of 1000 grams of alcohol and 40 grams of sodium hydroxide. The cooking liquor was separated from the bark residue by filtration. The liquor was transferred to water and the alcohol evaporated. The aqueous solution was acidified with sulphuric acid to precipitate a dark waxy resinous solid which was recovered by filtration. The precipitate was washed, dried and melted. The dry weight was 10.2 grams.

(b) Processing of the crude extract cake.

The 10.2 grams of crude extract cake was cooked again under reflux for two hours in 100 grams of alcohol containing 10 grams of sodium hydroxide. The cooking liquor was decanted from the insoluble resin salt retained in the flask and the cooking liquor was transferred to water by adding 50 grams of water and evaporating the alcohol. The resulting aqueous solution was cooled and a white precipitate of salt of wax was recovered by filtration. This was acidified, washed and melted. The filtrate liquor from this separation was acidified and a waxy resin complex was recovered. The insoluble residue remaining in the cooking flask was dissolved in water, acidified and recovered by filtration and washed and dried. Recoveries were as follows:

Salt of wax: 43.52% of starting material —4.44 grams— 4.44% of bark

Waxy resin complex: 25.49% of starting material— 2.6 grams—2.6% of bark

Lignin resin residue recovered as insoluble in alkaline cooking liquor: 3.13% of starting material—.32 gram —0.32% of bark

EXAMPLE II

*Refinement of alcohol-alkali crude in solution*

(a) Preparation of alcohol-alkali extract from Douglas fir bark.

Raw Douglas fir bark was ground in a hammermill. A sample weighing 10 pounds and containing 16% moisture was charged into a stainless steel reactor fitted with a filter bottom and containing 82 pounds of alcohol in which 2.5 pounds of sodium hydroxide had been dissolved. The reactor was made pressure tight and heated under agitation at 10 pounds alcohol vapour pressure for two hours. The crude liquor was then discharged into a tank for storage and the cooker cleaned.

(b) Processing crude liquor.

The liquor was returned to the cooker and concentrated in the cooker by evaporating the alcohol until the volume of liquor was reduced to 4 gallons with a sodium hydroxide strength of about 4%. The cooker was then made vapour tight and the concentrated liquor was cooked under 15 pounds alcohol vapour pressure for one and one-half hours. After cooking, the relief valve at the bottom of the reactor below the filter plate, was opened to discharge the cooking liquor leaving the insoluble solids as a cake on the filter. The cake was removed from the reactor and dried to remove process alcohol. The cake was subsequently dissolved in water and acidified with sulphuric acid. A precipitate formed upon acidification and the precipitate was filtered, washed and dried. The precipitate is a lignin resin residue which was a dark brown powder that melted on heating. It weighed 0.095 pounds. The filtrate liquor discharged from the cooker, after the concentrated cooking, was withdrawn to a heated still. The alcohol was removed by evaporation and 15 pounds of water was added. The aqueous solution was then withdrawn from the still and cooled to 20° C. A precipitate formed upon cooling and it was filtered to recover a salt of wax as a solid. The salt of wax was re-dissolved in water and acidified with sulphuric acid and again filtered, washed with clean water, melted and cooled to form a wax cake. This wax cake weighed 0.41 pounds. The filtrate liquor, from the separation of the salt of wax, was acidified with sulphuric acid, and the formed precipitate was recovered by filtration. This filter cake was washed and melted to give a waxy resin complex weighing 0.28 pounds.

The recoveries are summarized as follows:

Percent of bark
Wax cake 0.41 lbs. _____ 4.1
Waxy resin complex 0.28 lbs. _____ 2.8
Lignin-resin residue 0.095 lbs. _____ 0.95

EXAMPLE III

*Refinement of water, steam and sodium hydroxide crudes extracted from bark*

Several samples of press extracts were obtained for further processing. These extracts were recovered from samples of Douglas fir bark when the bark was pressed under the following conditions.

Sample #1: Bark fed to the press with 2 parts of hot water.

Sample #2: Bark fed to the press with 2 parts of hot water and steam admitted to the press during pressing.

Sample #3: Bark fed to the press with 2 parts of 0.3% of sodium hydroxide in aqueous solution and steam admitted to the press during pressing.

These samples were all dried and then each separately cooked under reflux for 2 hours in 5 parts of an alcoholic solution containing 4% sodium hydroxide. The cooking liquor was separated from the brown solid residues, and 20% of the liquid volume of the cooking liquor was added as water and the alcohol removed by distillation. The resulting aqueous alkaline solutions were cooled and a white precipitate recovered by filtration. This white precipitate was acidified and recovered as a wax. The filtrate liquor was acidified and a waxy resin complex was recovered. The solid residue which had been separated by filtration from the cooking liquor was acidified, washed and dried and recovered as a brown powder. This is a lignin resin residue.

Recoveries are shown as percentages of the starting materials referred to above as Sample #1, #2 and #3.

From Sample #1:
  Wax _____ 4.40
  Waxy resin complex _____ 5.38
  Lignin resin residue _____ 70.00
From Sample #2:
  Wax _____ 3.1
  Waxy resin complex _____ 6.2
  Lignin resin residue _____ 65.0
From Sample #3:
  Wax _____ 7.42
  Waxy resin complex _____ 9.52
  Lignin resin residue _____ 60.00

EXAMPLE IV

*Refinement of alcohol crude extract from Douglas fir bark*

(a) Preparation of alcohol crude extract.

100 grams of Douglas fir back was extracted with 10 parts alcohol by weight. The alcohol was distilled from the alcohol filtrate liquor and water was added to the extent of 20% of the volume of the original alcohol filtrate. The resulting liquor was heated to melt the lignin-wax-resin complex fraction, then cooled and filtered to recover the lignin-wax-resin fraction as a solid. The filtrate liquor was a solution of water solubles, (tannin and dihydroquercetin). The lignin-wax-resin complex fraction recovered weighed 8.6 grams.

(b) Separation of the alcohol crude extract into wax-resin-lignin fractions.

8.6 grams of the lignin-wax-resin complex obtained by extraction referred to above was cooked for 2 hours in 10 parts alcohol solution of 4% sodium hydroxide. The mass was filtered to provide a solid residue and a filtrate liquor. The filtrate liquor was evaporated to remove alcohol and 20% of the weight of the original alcohol was added as water. The aqueous solution was cooled and a formed white precipitate recovered by filtration. The white precipitate was acidified and recovered as a wax. The filtrate liquor was acidified and a waxy resin complex was recovered.

The recoveries are summarized as follows:

Wax by precipitation: 30% of starting material—2.58 grams—2.58% bark

Waxy resin complex: 17% of starting material—1.46 grams—1.46% bark

Lignin-resin residue: 53% of starting material—4.56 grams—4.56% of bark

EXAMPLE V

*Refinement of acid-alcohol crude extract from Douglas fir bark*

(a) Preparation of acid-alcohol crude extract.

The Douglas fir bark for this experiment was ground and extracted with hot water and then dried to 7% moisture content. 100 grams of the dry bark was cooked under reflux for 2 hours in a solution of 1000 grams alcohol and 40 grams of sulphuric acid. The cooking liquor was separated from the bark residue by filtration and 500 grams of water was added to the filtrate and the alcohol distilled off. This aqueous liquor was heated and filtered to separate a dark resinous water insoluble extract from the water soluble fraction and the insoluble extract was washed to remove traces of cooking acid and then dried. The dry weight of the insoluble extract was 10.15 grams.

(b) Separation of the acid-alcohol crude extract into wax, resin and lignin fractions.

The extract weighing 10.15 grams was cooked in 100 grams alcohol and 4 grams of sodium hydroxide for 2 hours under reflux. The solid residue was separated from the cooking liquor and 20 grams of water was added to this liquor and the alcohol was distilled off. The aqueous solution was cooled and a formed white precipitate recovered by filtration. The white precipitate was washed and recovered as a wax. The filtrate liquor was acidified and a waxy resin complex was recovered. The insoluble cooking residue was dissolved in water, acidified, washed and dried. Recoveries are shown as follows:

Lignin-resin residue recovered as insoluble in alkaline-alcohol cooking liquor—45.3% of starting material—4.7 grams—4.7% bark
Wax by precipitation—28.3% of starting material—2.88 grams—2.88% bark
Waxy resin complex—10.0% of starting material—1.02 grams—1.02% bark

EXAMPLE VI

*Refinement of benzene crude extract from bark*

(a) Preparation of benzene crude extract.

Douglas fir bark was ground and extracted with hot water and then dried to 7% moisture content. 100 grams of the dried bark was refluxed for 2 hours in 1000 grams of benzene and the hot benzene solution was separated from the bark residue by filtration. The benzene crude extract was recovered by evaporation of the benzene. The crude extract weighed 5 grams.

(b) Processing of the benzene crude extract.

5 grams of crude extract was cooked under reflux for 2 hours in 50 grams of alcohol containing 4 grams of sodium hydroxide. The cooking liquor was decanted from the insoluble resin salt retained in the flask and the liquor was transferred to water by adding 20 grams of water and evaporating the alcohol. The resulting aqueous solution was cooled and a formed white precipitate of wax was recovered by filtration. The wax precipitate was acidified, washed and melted. The filtrate liquor from this separation was acidified and a waxy resin complex was recovered. The insoluble cooking residue remaining in the cooking flask was dissolved in water, acidified and recovered by filtration and then washed and dried. Recoveries are shown as follows:

Lignin-resin recovered as insoluble in alkaline cooking liquor: 2% of starting material—0.1 grams—0.1% bark
Wax by precipitation: 42.4% of starting material—2.12 grams—2.12% bark
Waxy resin complex: 9% of starting material—0.45 grams—0.45% bark

EXAMPLE VII

*Refinement of crude resin wax complex from Douglas fir bark*

(a) Processing of crude wax from Douglas fir bark.

Samples of a crude resin wax complex from Douglas fir bark were obtained for further processing. This material was 47% soluble in hot hexane, 92% soluble in hot benzene and almost entirely soluble in hot alcohol. 100 grams of this dark crude wax was cooked for 2 hours under reflux in 1000 grams of alcohol containing 4% sodium hydroxide. The cooked mass was filtered to separate the solids from the liquor and 200 grams of water was added to the filtrate liquor and the alcohol distilled off. The resulting aqueous solution was cooled to 20° C. and a white salt of wax precipitate which formed upon cooling was recovered by filtration. The salt of wax was acidified, washed and melted. The filtrate liquor from this separation was acidified and a waxy resin complex was recovered. The insoluble residue which had been separated from the cooking liquor by filtration was dissolved in water and acidified and a precipitate recovered by filtration. The precipitate was washed and dried as a dark brown powder. Recoveries are shown as a percentage of the starting material.

Wax: 53 grams—53% of starting material
Waxy resin complex: 13 grams—13% of starting material
Lignin-resin residue: 25 grams—25% of starting material The inventions herein described are not limited to particular species of bark or the specific crude extracts described in the examples. Further, the alcoholic solution may contain sodium hydroxide, potassium hydroxide or other alkali metal hydroxides. It is the intention and desire that the inventions be given the broadest possible scope based upon the herein contained disclosures and explanations.

What is claimed as new is:

1. The process of refining a crude composition consisting of a resinous complex obtained from bark comprising cooking the crude in an alcoholic solution of alkali metal hydroxide from the group consisting of NaOH and KOH to produce a liquor having solubles and resin salt insolubles, said alkali metal hydroxide being from 4% to 10% of the weight of the alcohol, said alcohol solution being approximately 10 times the weight of said crude, said crude having no more than 10% water of the combined weight of said crude and said alcohol solution, and separating said resin salt insolubles from said liquor filtrate.

2. The process of claim 1, and adding water to said liquor filtrate, removing said alcohol from said aqueous liquor filtrate by distillation, cooling said aqueous liquor filtrate to form a salt of wax precipitate, and separating said salt of wax precipitate from said cooled aqueous liquor filtrate by filtration.

3. The process of claim 1 and wherein said bark is from the group consisting of Douglas fir bark, lodge pole pine, and yellow pine.

4. The process of claim 1 and acidifying said cooled aqueous liquor filtrate to a pH of 2, to precipitate a wax resin complex, and separating said wax resin complex from said cooled aqueous liquor filtrate.

5. The process of claim 1 and wherein said crude is obtained by extraction by solvents from the group consisting of benzene, alcohol, water, alkali-alcohol, alcohol-acid, water-steam, and water-steam-sodium hydroxide.

6. The process of claim 1 and wherein said cooking is done under reflux.

7. The process of claim 1 and acidifying said resin salt insolubles to obtain a lignin resin residue.

References Cited in the file of this patent

UNITED STATES PATENTS

| | | |
|---|---|---|
| 2,526,607 | Kurth | Oct. 17, 1950 |
| 2,781,336 | Zenczak | Feb. 12, 1957 |